United States Patent [19]

Smedley et al.

[11] Patent Number: 4,811,358

[45] Date of Patent: Mar. 7, 1989

[54] SUBSCRIBER LINE INTERFACE MODEM

[75] Inventors: Colin P. Smedley, Hampshire; Martin J. Linda, Dorset, both of England

[73] Assignee: Plessey Overseas Limited, Ilford-Essex, England

[21] Appl. No.: 95,509

[22] Filed: Sep. 10, 1987

Related U.S. Application Data

[63] Continuation of Ser. No. 802,498, Nov. 27, 1985, abandoned.

[30] Foreign Application Priority Data

Nov. 28, 1984 [GB] United Kingdom ................. 8430003

[51] Int. Cl.$^4$ .............................................. H04N 3/02
[52] U.S. Cl. .......................................... 375/8; 370/58; 375/10
[58] Field of Search ....................... 370/15, 53, 58, 92; 375/7, 8, 9, 10; 371/22; 332/1; 379/97, 98

[56] References Cited

U.S. PATENT DOCUMENTS

| | | | |
|---|---|---|---|
| 4,097,695 | 6/1978 | Grace et al. | 370/92 |
| 4,263,670 | 4/1981 | Sherman | 375/9 |
| 4,324,000 | 4/1982 | Ali | 370/92 |
| 4,335,446 | 6/1982 | Gandini et al. | 375/9 |
| 4,431,867 | 2/1984 | Heatherington | 379/98 |

Primary Examiner—Benedict V. Safourek
Attorney, Agent, or Firm—Fleit, Jacobson, Cohn & Price

[57] ABSTRACT

The subscriber line interface modem is for use in a telecommunications system line interface module which also includes subscriber signalling and switching circuits and a control microprocessor. The modem comprises bus interfacing means, channel means and clock supply means. The interfacing means receives address data and control information from the microprocessor and dispatches address, data and control information to the microprocessor for evaluation. The channel means includes a non-return to zero/conditioned diphase modulation (NRZ/CDM) conversion means which receives NRZ coded information from the circuits and dispatches CDM information to the subscriber line. A CDM/NRZ conversion means receives CDM information from the subscriber line and dispatches NRZ coded information to the circuits. The processing of information through the modem is controlled by the microprocessor in conjunction with the clock signals generated by the clock supply means.

7 Claims, 12 Drawing Sheets

SUBSCRIBER LINE INTERFACE MODEM

FIELD OF INVENTION

The present invention relates to a subscriber line interface modem for use in a telecommunications system line interface module, and is a Continuation application of U.S. patent application Ser. No. 802,498, filed Nov. 27, 1985, (Abandoned).

DESCRIPTION OF THE PRIOR ART

The modem is a digital device designed to interface between a conditioned diphase modulation (CDM) coded subscriber line and a non-return to zero (NRZ) coded line interface circuit.

The modem implements six channels which greatly reduces the physical size of the line interface area.

An aim of the present invention is to provide a subscriber line interface modem for use in a telecommunications system.

SUMMARY OF THE INVENTION

According to the present invention there is provided a subscriber line interface modem, for use in a telecommunications system line interface module including telecommunications subscriber signalling circuits, switching circuits and a control microprocessor, the modem comprising bus interfacing means, channel means and clock supply means, wherein the bus interfacing means is adapted to receive address, data and control information from the microprocessor and is adapted to dispatch address, data and control information to the microprocessor for evaluation, the channel means includes a non-return to zero/conditioned diphase modulation (NRZ/CDM) conversion means arranged to receive from the telecommunications circuits NRZ coded information, and dispatch CDM information to a telecommunications subscriber line, and a CDM/NRZ conversion means arranged to receive CDM information from the subscriber line and dispatch NRZ coded information to the telecommunications circuits; the processing of information through the modem is controlled by the microprocessor in conjunction with the clock signals generated by the clock supply means.

STATEMENT OF THE OBJECTS OF THE INVENTION

According to an object of the present invention there is provided a subscriber line interface modem wherein the bus interfacing means includes a data transceiver which receives data from, and transmits data to the microprocessor, where the data is received and transmitted by a command register associated with each channel means, under the control of channel read and write signals.

According to a further object of the present invention there is provided a subscriber line interface modem wherein the command register controls a clock rate selection circuit which selects clock frequencies and window signals for the selection circuit, to operate the selection circuit at frequencies of 64 Kb/s, 32 Kb/s or 16 Kb/s.

BRIEF DESCRIPTION OF THE DRAWINGS

An embodiment of the present invention will now be described with reference to the accompanying drawings wherein.

DESCRIPTION OF THE PREFERRED EMBODIMENT

Figure 1:
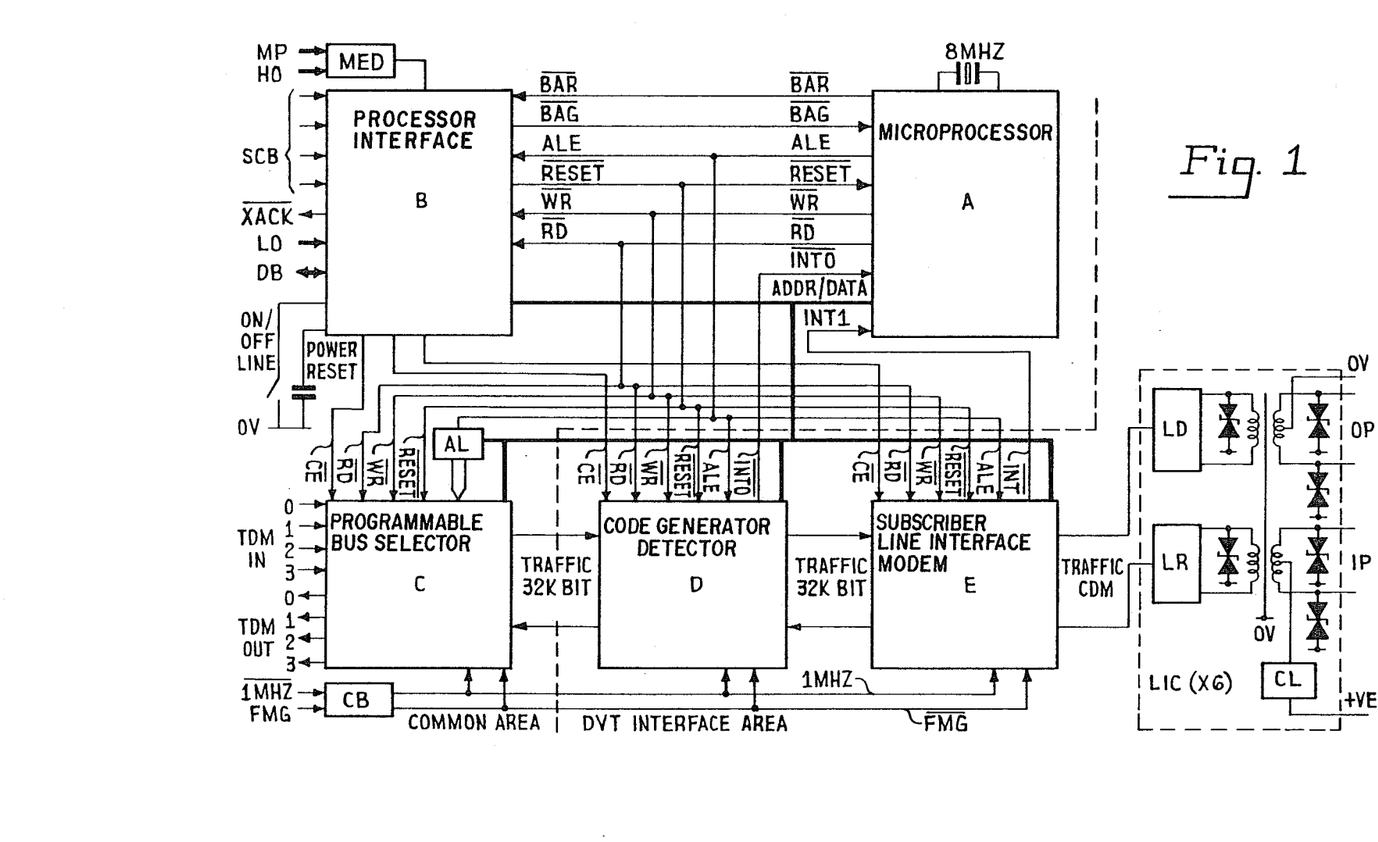
FIG. 1 shows a block diagram of part of a six channel telecommunications module.

Referring to FIG. 1, the system block diagram shows a microprocessor A controlling a 32 byte two port processor interface B, a universal programmable bus selector C, a cyclically permutable code generator detector D, and, a subscriber line interface modem E which forms the basis of the present invention.

The microprocessor A communicates with the units B-E by way of the address/data bus ADDR/DATA. The unit D generates control signals $\overline{INTO}$ for the microprocessor A. The microprocessor A generates signals $\overline{RD}$, $\overline{WR}$, for units B-E, signal ALE for units B, D, E and address latch AL and request signal $\overline{BAR}$ for unit B. Unit B acts as a two port buffer with arbitration between the shelf system bus and the microprocessor A. Unit B receives shelf control bus signals SCB and generates a transfer acknowledgement signal $\overline{XACK}$ and a signal $\overline{RESET}$.

A low order shelf address bus LO, and a high order shelf address bus HO is provided, the latter being connected to a module enable decoder MED, which receives a module position address bus MP. A data bus DB feeds into and out of the unit B. Unit B generates a decode signal $\overline{CE}$ for units C, D and E and a request granted signal $\overline{BAG}$ for the microprocessor A.

The universal programmable bus selector C provides a common interface between six single channel digital traffic terminations operating at 32K bits per second. It receives TDM signals at 1M bit per second and transmits TDM signals out at 1M bit per second. The unit has an address latch input to which the address latch AL is connected.

The units A, B and C belong to a common area and the units D and E belong to a digital voice terminal interface area.

The cyclically permutable code generator detector D detects and generates cyclically permutable codewords for any of six independent channels and is controlled by a standard microprocessor interface. Eleven registers provide command and status information for full control. A codeword is detected if incoming serial data contains any eight bit word repeated consecutively six times. Generation of a codeword is by continuous serial transmission of a data byte loaded by the control interface. The unit D receives traffic from units C and E and transmits traffic to units C and E.

The subscriber line interface modem E is the subject of the present invention and will be described in detail later. It interfaces between the NRZ traffic from unit D and the six line interface circuits LIC forming the channel rate four wire digital voice terminal loops to the subscribers.

Each of the units C, D and E receive a framing and a 1MHz clock signal from a clock buffer CB.

Each line interface circuit comprises trapezoidal line drivers LD, line receivers LR and a current limiter CL. The subscriber line inputs are shown as IP and the outputs OP.

The subscriber line interface modem will now be described in detail. The modem contains all the retiming and code conversion (conditioned diphase modulation/non-return to zero, CDM/NRZ and NRZ/CDM) necessary for this function.

MODES OF OPERATION

Channel Rate

The subscriber line interface modem can work at three channel rates 64, 32 and 16K bits/s. Each channel can be individually set by writing the appropriate command byte to the channel address. The command bytes are shown below.

| RATE | COMMAND BYTE | | | | | | | |
|---|---|---|---|---|---|---|---|---|
| | d7 | | | | | | | d0 |
| 64K | X | X | X | X | X | 1 | 1 | X |
| 32K | X | X | X | X | X | 1 | 0 | X |
| 16K | X | X | X | X | X | 0 | 1 | X |
| channel disabled | X | X | X | X | X | 0 | 0 | X |

Looprounds

The modem may be set to loopround the CDM output of a channel into the channel CDM input. This aids module diagnosis by allowing the data path to be checked prior to going off the module. The loopround may be set on a per channel basis by setting bit three of the channel address. The loopround disables the CDM retiming circuit. The effective CDM input data is clocked in using the same strobe point as was used just prior to loopround being set. The timing is so arranged in the modem that either of the two possible strobe points may be used, as shown in FIG. 2.

Figure 2:
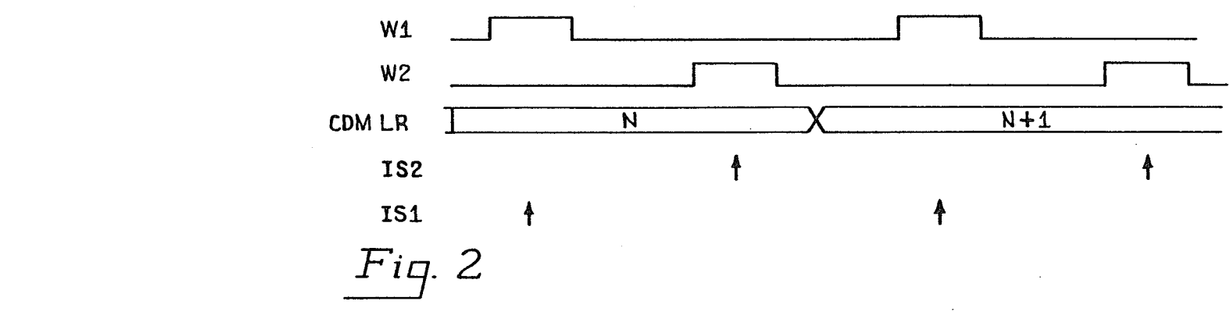
FIG. 2 shows a timing diagram for a loopround function.

FIG. 2 shows two pulses representing windows W1 and W2, and the CDM loopround data waveform CDMLR. Input strobe IS2 corresponds with window W1, and input strobe IS1 corresponds with window W2. If there are no CDM edges in either of the windows W1 or W2 either input strobe may be used.

Addressing Modes

The modem may be driven by microprocessors with either:
 (a.) Multiplexed address/data buses, or (b.) Separate address and data buses.

In option a, the inputs DA0-7 are used in the multiplexed address/data input. In option b, the inputs A0-2 receive the address inputs and DA0-7 receive the data inputs.

Device Reset

The modem may be reset from three sources:
 a. The $\overline{\text{RESET}}$ input.
 b. The RESET bit address 0, bit 0.
 c. The individual channel mode bits.
These are described as follows:

$\overline{\text{RESET}}$ Input

When this input is active (low), all storage elements within the device are reset or set to their quiescent state. All channel mode bits are forced to the 'disabled' state. The $\overline{\text{RESET}}$ input whilst active sets all normal outputs to a tristate condition and all open collector outputs to a high state. Data output drivers are tristate when either Read enable RD, Chip Select CE are inactive, or $\overline{\text{RESET}}$ active.

Software Reset (address 0, bit 0)

This bit, when set to '1', resets all internal registers as the $\overline{\text{RESET}}$ input above. However it does not set normal outputs to the tristate condition.

Individual Channel Reset

An individual channel may be reset by setting the mode bits at the channel address.

FUNCTIONAL DESCRIPTION

Figure 3:
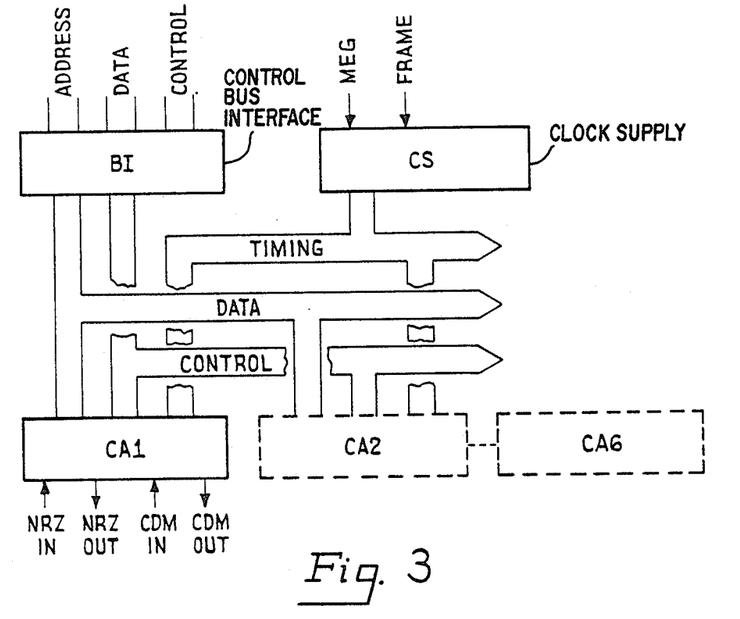
FIG. 3 shows a functional block diagram of a subscriber line interface modem.

The modem consists of three main functional areas, as shown in FIG. 3.
 a. Clock supply, CS
 b. Control bus interface, BI
 c. Channel areas, CA1-CA6
Each functional area is divided into sub-areas. These are detailed below.

Clock Supply

Figure 4:
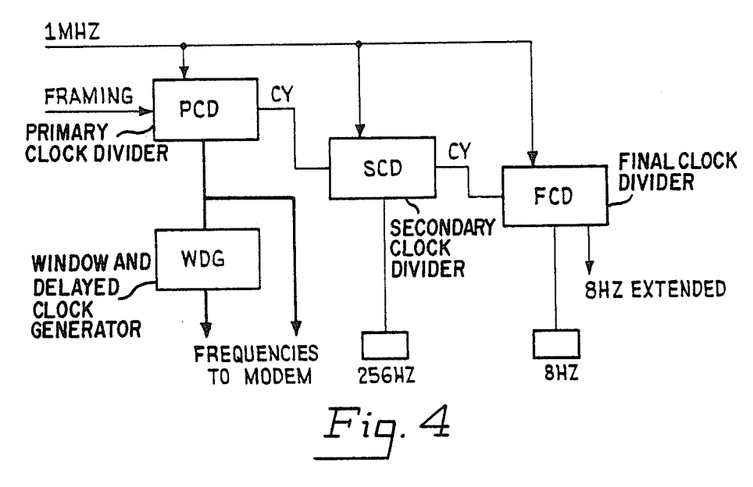
FIG. 4 shows a block diagram for the clock supply area of a subscriber line interface modem.

The clock supply area is divided into four areas as shown in FIG. 4.
 a. Primary clock divider, PCD
 b. Window and delayed clock generator, WDG
 c. Secondary clock divider, SCD
 d. Final clock divider, FCD The primary clock divider consists of a synchronous down counter of seven stages. It provides clock signals of 512K, 256K, 128K, 64K, 32K, 16K and 8 KHz to the window, delayed clock generator and the channel areas. The frequencies are divided from (the 1MHz input), $\overline{\text{MEG}}$.

Figure 5:
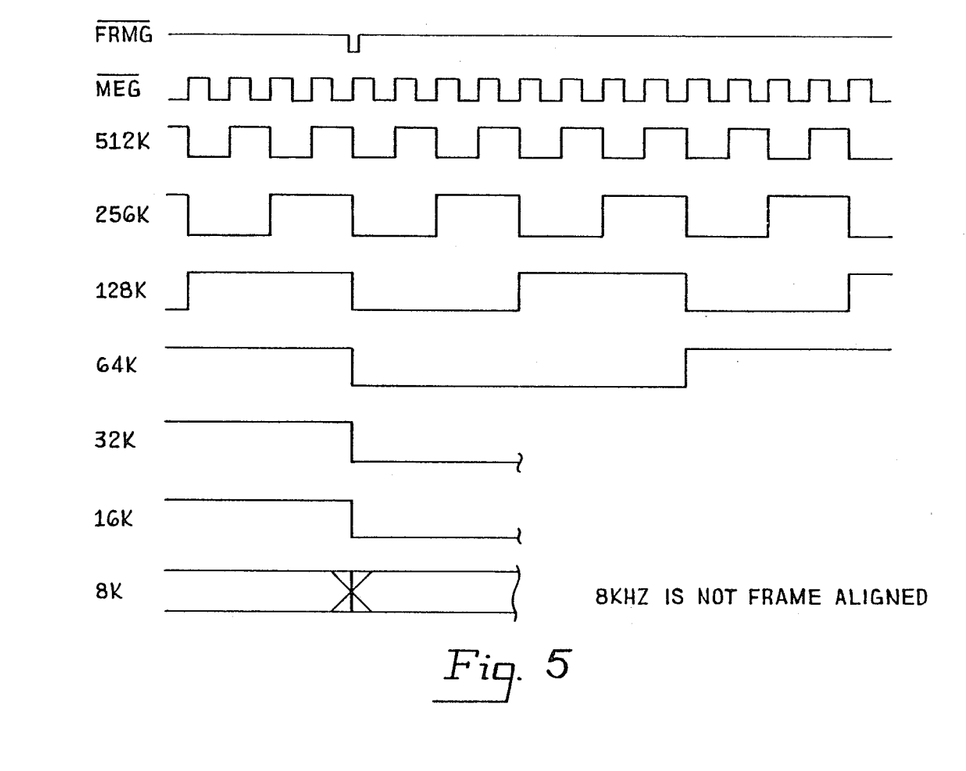
FIG. 5 shows primary clock waveforms.

The clock divider is synchronised from the $\overline{\text{FRMG}}$ input, and the waveforms are shown in FIG. 5. The first six stages of the divider are not cleared from $\overline{\text{RESET}}$ input but from the $\overline{\text{FRMG}}$ input.

Window and Delayed Clock Generator

Figure 6:
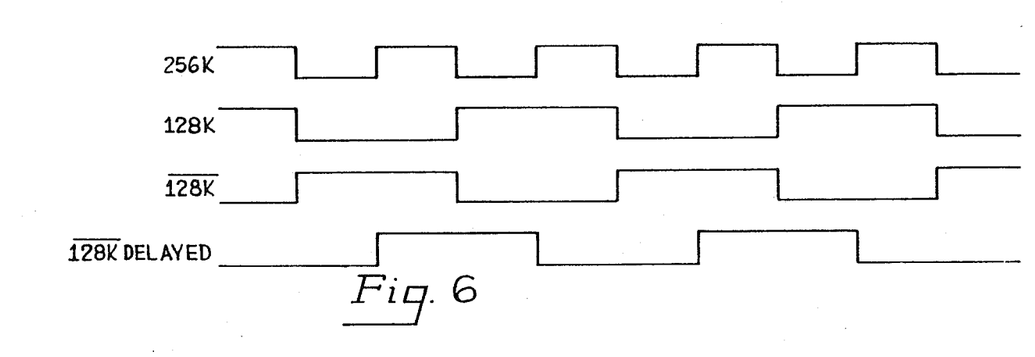
FIG. 6 shows examples of delayed clock generation.

Delayed clocks are generated for use by the rest of the modem. Clock frequencies generated are $\overline{128K}$, $\overline{64K}$, $\overline{32KHz}$ delayed. The signals are generated by clocking the frequency required by twice the frequency as shown in FIG. 6. This section also generates window waveforms for the channel CDM edge detection sections. The windows are generated by gating 2×channel rate with 4×channel rate clock (delayed).

A Secondary Clock Divider

Figure 7:
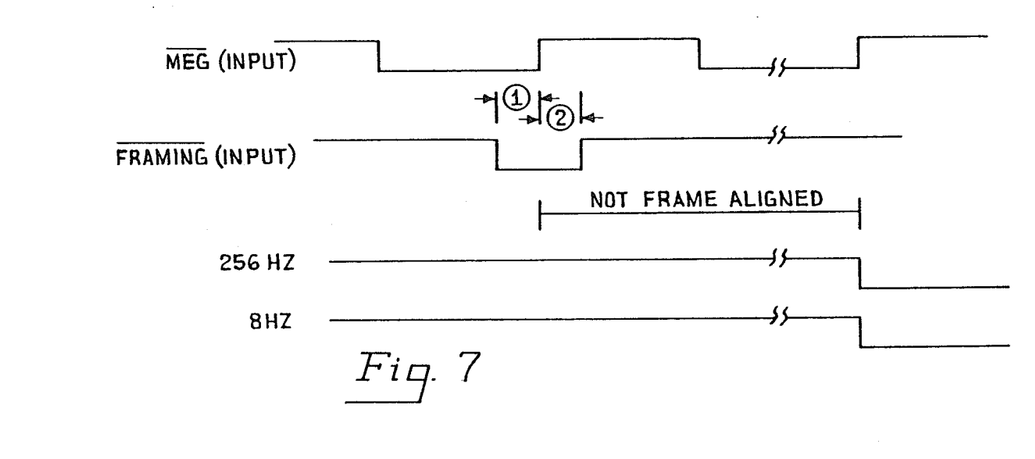
FIG. 7 shows clock output alignment waveforms.

This section consists of a five stage synchronous down counter. It provides an external clock frequency of 256 Hz. The counter is clocked by the $\overline{MEG}$ input, receiving a carry from the primary stage. This stage may be reset by the input $\overline{RESET}$. The divider is not synchronised by the framing input. The waveforms are shown in FIG. 7.

Final Clock Divider

This section consists of a five stage synchronous down counter. It provides the external output frequency of 8 Hz; also 8 Hz and 8 Hz extended by 1 microsecond for use in the CDM edge detection circuitry. The counter is clocked by the 1MHz input, and receives a carry input from the secondary divider. The counter may be reset by the input $\overline{RESET}$. The divider is not synchronised by the framing input. The waveforms are shown in FIG. 7.

Control Bus Interface

Division of Interface Areas

Figure 8:
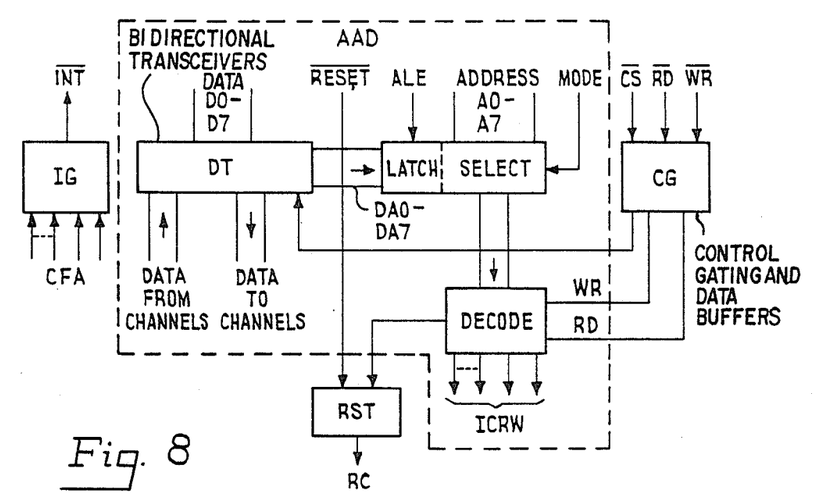
FIG. 8 shows a control bus interface arrangement.

The Control Bus interface area is divided into the following areas as shown in FIG. 8.
a. Address area and decoding, AAD.
b. Control gating and data buffers, CG.
c. Reset circuit, RST.
d. Interrupt gating, IG.

Address Area and Decoding

This section receives the address input from either the address inputs A0-7 or from the multiplexed inputs DA0-7. The address is latched from the inputs DA0-7 by transparent latches controlled by the ALE input. Selection of address source is controlled by the MODE input. The three bit address is decoded into six enable signals for each of the channel areas. These are then gated with Write and Read signals $\overline{WR}$ and $\overline{RD}$ and driven to the channel areas over wires ICRW.

The $\overline{RD}$ and $\overline{WR}$ input signals are enabled by the $\overline{CS}$ signal before being distributed within the modem. The resultant Read control is then used to control the data interface DA0-7 bi-directional transceivers; DT. The transceivers are only driven when the $\overline{RD}$ and $\overline{CS}$ signals are low.

Reset Circuit

The reset circuit consists of a latch which is set when a '1' is written into address 0 of bit 0. This causes the 'Reset' condition. RC to be applied to the channels and the clock. Similarly when a '0' is written it will clear the latch. The input $\overline{RESET}$ acts directly on the output of the latch, causing the Reset condition directly whenever $\overline{RESET}$ is active. The output of the latch drives the modem reset lines to the rest of the device.

Interrupt Gating

The interrupt output of the modem is driven in response to any of the six channel CDM failure alarms CFA becoming available.

If any of the CDM failure alarms becomes active a pulse is generated which clears an interrupt latch. This sets the output $\overline{INT}$ active. The output remains active until a read access occurs at address 0. The latch is then set and the signal INT becomes inactive.

Channel Areas

Division of Channel Areas

Figure 9:
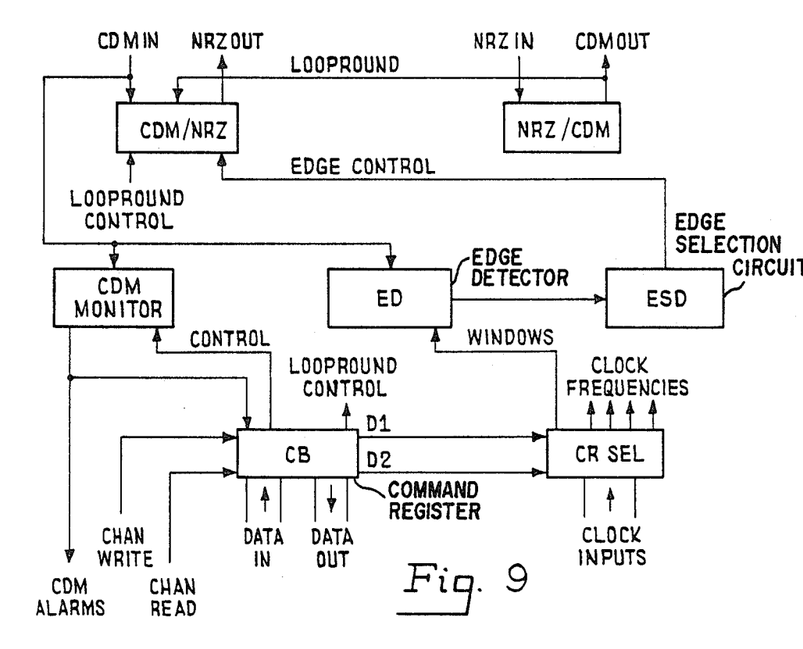
FIG. 9 shows a block diagram of the channel areas.

The channel areas may be divided into the following sections as shown in FIG. 9.
a. Command Register.
b. Timing Switchover.
c. CDM to NRZ Converter.
d. NRZ to CDM Converter.
e. CDM Edge Detector.
f. Edge Selection Damping.
g. CDM Failure Monitor.

Command Register

The Command Register, CB is used to store the control byte for the channel which is written to the modem control input. The register consists of latches controlled by the channel write command from the control bus area. The outputs of the latch are driven to the data bus in response to the channel read command. This allows the present status of the channel to be read via the modem data outputs. The outputs of the register are also distributed to the respective channel areas.

Clock Rate Selection

The clock rate selection circuit receives clock frequencies and window signals from the clock CR SEL generator section. The circuit then selects the correct frequency for 64, 32 and 16 kb/s operation. The control is derived from the command register bits D2 D1 as shown in the Tables A and B below. The resultant signals are distributed to the other channel sections as defined in Table A below.

TABLE A

| SIGNAL | TIMING SELECTOR-OPTIONS. | | | TO SECTION |
| --- | --- | --- | --- | --- |
| | 64 Kb/s | 32 Kb/s | 16 Kb/s | |
| WINDOW 1 | CW 1 | BW 1 | AW 1 | EDGE DETECTOR |
| WINDOW 2 | CW 2 | BW 2 | AW 2 | |
| INPUT STROBE | 128 DEL | 64 DEL | 32 DEL | CDM/NRZ (TRUE OR INVERTED) |
| | 32 | 16 | 8 | SELECT DAMPING |
| INPUT STROBE | 64 | 32 | 16 | NRZ/CDM |
| CDM GEN STROBE | 128 | 64 | 32 | |

CLOCK SIGNAL USED

TABLE B

TRUTH-TABLE TIMING SELECTION.

| DATA BIT | | |
|---|---|---|
| D2 | D1 | |
| 0 | 0 | CHANNEL RESET/DISABLE |
| 0 | 1 | 16 Kb/s |
| 1 | 0 | 32 Kb/s |
| 1 | 1 | 64 Kb/s |

CDM to NRZ Converter

The converter converts the CDM input to NRZ. The Circuit can strobe the CDM in with one of two strobe points STROBE 1 or STROBE 2. The choice is determined by the mode signal from the edge selection circuit ESD.

NRZ to CDM Converter

Figure 10:
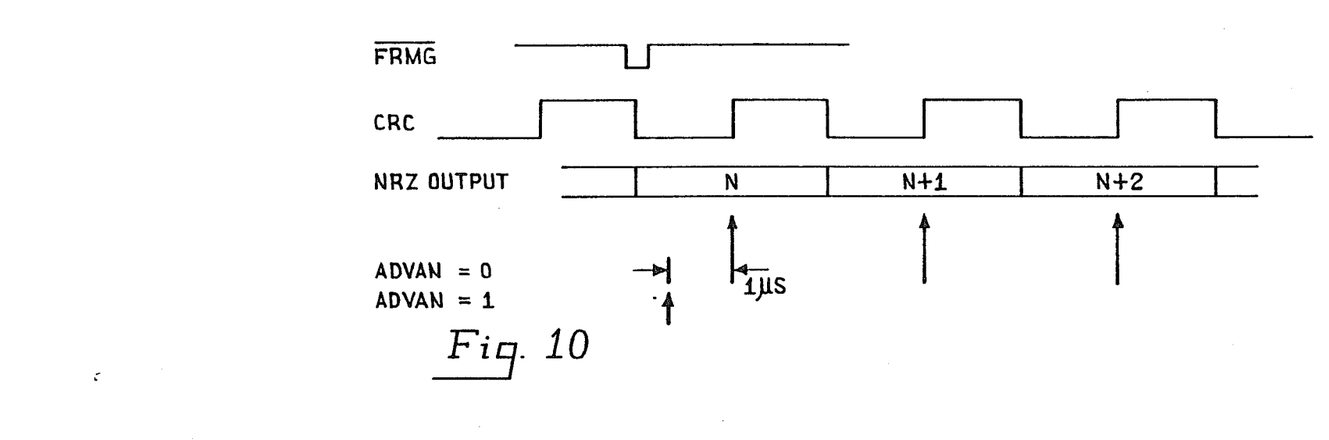
FIG. 10 shows a timing diagram of NRZ traffic input and output.

The converter converts the NRZ input data to CDM code. FIG. 10 shows the interface timing. This section has provision for an adjustable NRZ input strobe point in response to an input signal ADVAN. When ADVAN=0 the NRZ data is strobed on the positive edge of the channel rate clock, CRC. When ADVAN=1 the NRZ data is strobed 1 microsecond earlier than the positive edge.

CDM Edge Detector

Figure 11:
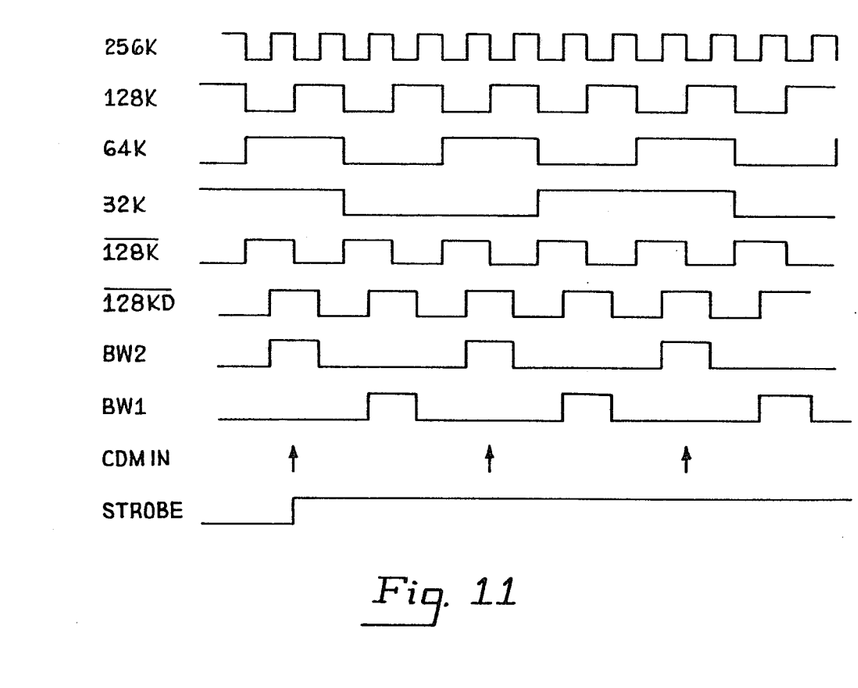
FIG. 11 shows timing waveforms relating to a CDM edge detector.

The detector monitors the input CDM waveform in order that the modem clocks the data in at the optimum time. The input stream is compared with the window inputs W1, W2. If any edge occurs within a window then the output signal can change. The output changes if the edge is in the opposite window to that last detected. This output, is then passed to the edge selection damping area ESD. The waveforms are shown in FIG. 11.

Edge Selection Damping ESD

This circuit consists of a three bit GRAY-CODE up/down counter. The counter counts at the channel rate. It counts up if the strobe input is 1 and down if the strobe input is 0. The count sequence is shown in the Table C below. When the end state is reached the counter remains in that state until the opposite state clocks occur. The result the 'MODE' signal is latched and held until the opposite end state is reached. The effect of this sequence is to only allow a change of sampling point after seven "edge-in-window" detections. Equivalent to 0.5 mS at 32 KHz.

TABLE C

| EDGE SELECTION DAMPER SEQUENCE | | | | |
|---|---|---|---|---|
| END STATE | 0 | 0 | 0 | |
| Mode becomes '0' | 0 | 0 | 1 | |
| | 0 | 1 | 1 | DOWN = STROBE = 0 |
| | 0 | 1 | 0 | |
| | 1 | 1 | 0 | |
| | 1 | 1 | 1 | |
| | 1 | 0 | 1 | |
| END STATE | 1 | 0 | 0 | UP = STROBE = 1 |
| Mode becomes '1' | | | | |

CDM Failure Monitor

This circuit monitors the CDM input waveform for the channel and indicates any lack of data by setting bit D6 of the channel status byte. High-going edges of the CDM input causes a latch to be set during a 62.5 ms period. At the end of this period the result is stored. The contents of the store form the 'CDM STATUS'.

Figure 12:
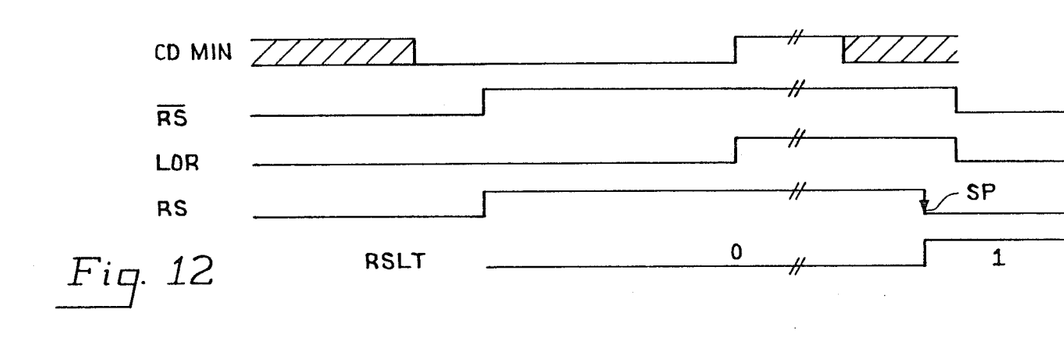
FIG. 12 shows timing waveforms relating to a CDM monitor.

The CDM status is fed both to the channel status register and to the interrupt gating area. FIG. 12 shows the relationship between the CDM input signal CDMIN, the Reset Latch signal $\overline{RS}$, the Latch Output Reset signal LOR, the Result Strobe RS showing the strobe point and the result signal RSLT. When the result signal goes to a 1, CDM is present The cross-hatched portions of the CDM input signal are irrelevant.

INTERFACE SIGNAL DESCRIPTIONS

Control Signals

Chip Select ($\overline{CS}$) active low

This signal when active enables the device to respond to write and read control accesses. The signal allows memory mapping of the device.

Write Enable ($\overline{WR}$) active low.

This signal indicates to the modem that address and data inputs are valid. Data is strobed in the high going edge of the signal.

Read Enable ($\overline{RD}$) active low.

This signal indicates to the modem that data may be driven onto the data outputs.

Mode active low.

This input determines the type of address input:

MODE=1 Multiplexed Address/data.

MODE=0 Separate Address and data input.

Address Inputs (A0–A2).

These inputs are used for address inputs when MODE=0. The address must remain valid throughout the access. When MODE=1 these inputs are ignored.

Multiplexed Address/data (DA0–7) active high (true).

These signals are bi-directional. In a control access an address is asserted on lines DA0–7 and strobed in by the signal ALE. Data then replaces the address either driven externally (write) or driven by the modem when $\overline{RD}$=0.

Address Latch Enable (ALE) active high.

This input is used when MODE=1. When MODE=0 it is ignored. When the signal ALE is high the address on lines DA0–7 is allowed through to the device. On the low going edge of signal ALE the address is latched.

Interrupt Output ($\overline{INT}$) active low.

This signal becomes active whenever a CDM failure occurs on any channel. The signal is reset by a read access to channel 0.

RESET Input ($\overline{RESET}$) active low.

This signal, when active resets all internal storage elements of the modem.

Traffic Signals

NRZ Inputs active high (true).

These signals are the NRZ inputs to the modem for channels A–F respectively. Data is strobed in on the positive edge of the channel rate clock.

ADVANCE Input (ADVAN) active high (True).

This signal is used to control the input strobe point of the NRZ inputs. When high the NRZ data is strobed in advance of the normal strobe point.

NRZ Outputs active high (True).

These signals are the NRZ receive data outputs of channels A–F respectively. Data is strobed out on the negative edge of the channel rate clock.

CDM Inputs active high (True).

These signals are the CDM received inputs from the line buffers, channels A-F respectively. Data is strobed in 25% from the edges of the CDM signal.

CDM Outputs active high (True).

These signals are the CDM Outputs of the modem for channels A-F respectively. Data is strobed out on the negative edge of twice the channel rate clock.

Timing Signals

1 Megahertz clock input ($\overline{MEG}$) active low.

Figure 13:
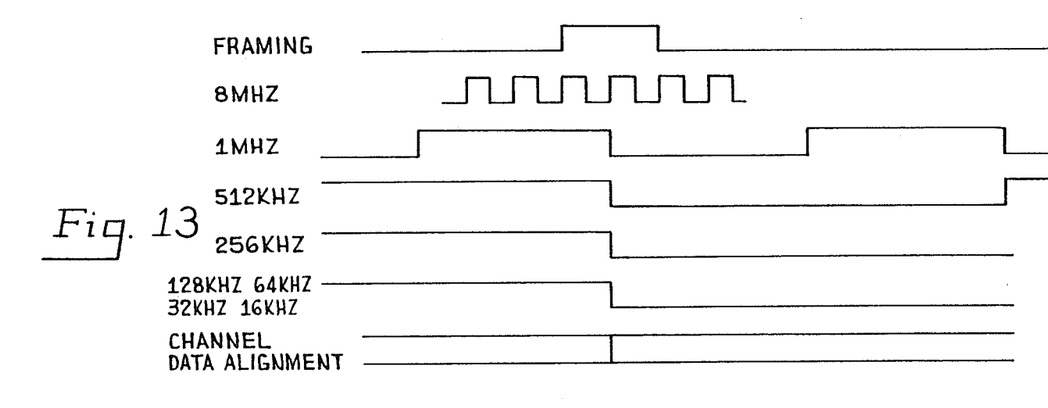
FIG. 13 shows the relationship of various clock signals to a framing signal.

This input provides the master clock for all traffic operations. The timing relationships are shown in FIGS. 7 and 13.

Framing Input ($\overline{FRMG}$) active low.

This input synchronises the clock dividers within the modem to others externally.

Timings

The timings for the device interface are shown in the following diagrams.

Figure 14:
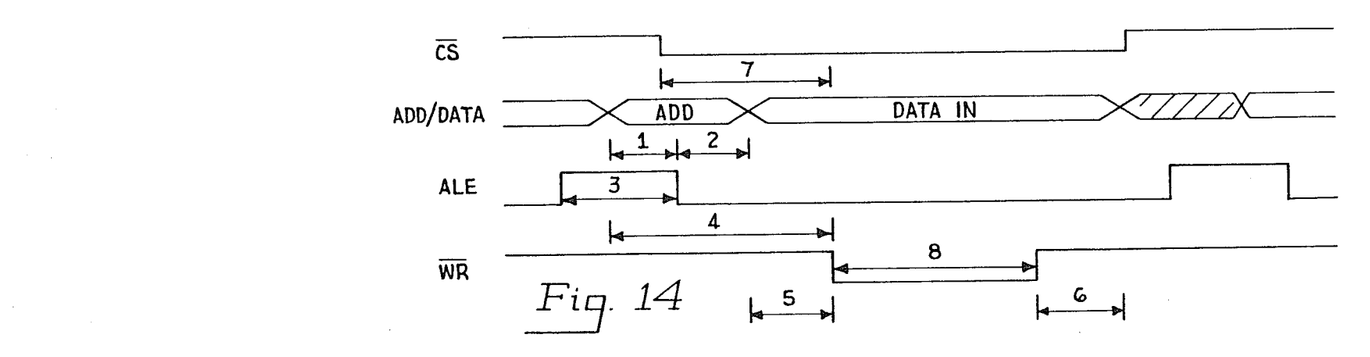
FIG. 14 shows a subscriber line interface modem bus interface write cycle.
Figure 15:
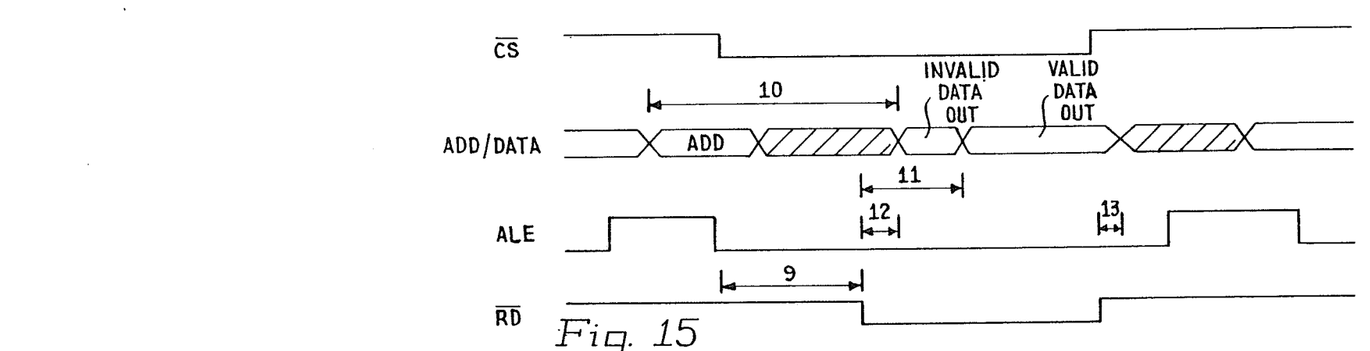
FIG. 15 shows a subscriber line interface modem bus interface read cycle.
Figure 16:
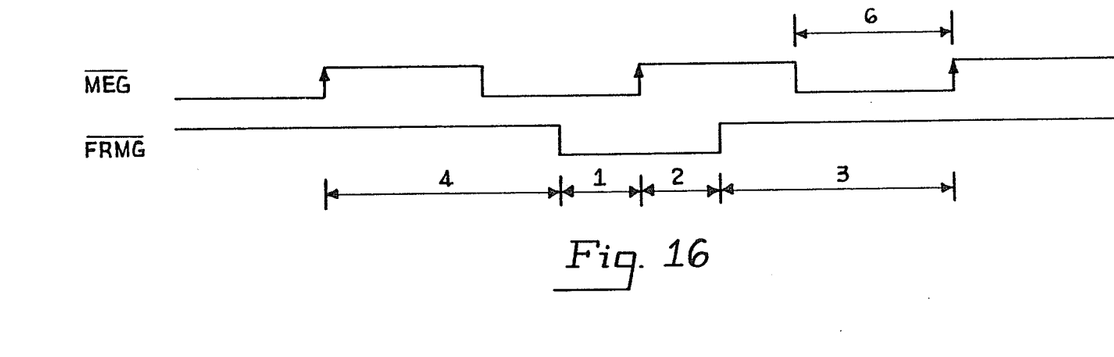
FIG. 16 shows clock and frame input timing waveforms.
Figure 17:
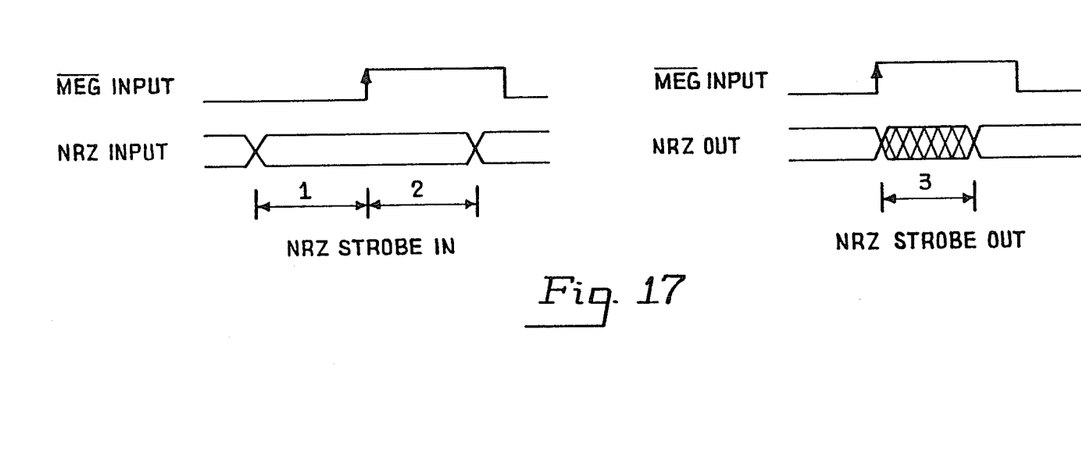
FIG. 17 shows NRZ timing waveforms.
Figure 18:
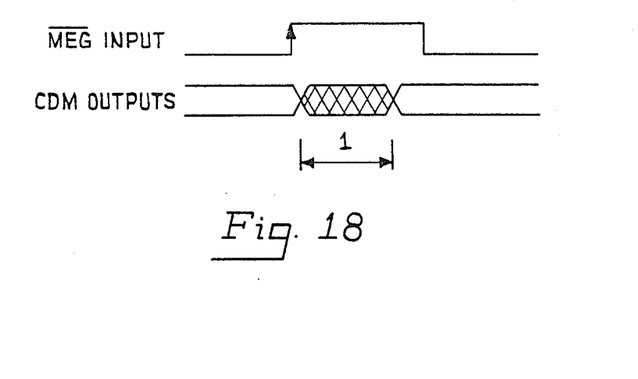
FIG. 18 shows CDM timing waveforms.

FIG. 14: Bus Interface Write Cycle.
FIG. 15: Bus Interface Read Cycle.
FIG. 16: Clock and Frame Input Timing.
FIG. 17: NRZ Timing.
FIG. 18: CDM Timing.

The parameters detailed below are referenced by a number, the corresponding number also appears on the diagrams for easy reference.

| REFERENCE | BUS INTERFACE PARAMETER | |
|---|---|---|
| | General | MINIMUM (nS) REQUIRED |
| 1. | Address to ALE negative edge set-up. | 17 |
| 2. | Address hold after ALE negative edge. | 27 |
| 3. | ALE pulse width. | 28 |
| | Write Access. | |
| 4. | Required address to WR active set-up. | |
| | a. Multiplexed address. | 64 |
| | b. Non-multiplexed address. | 28 |
| 5. | Data set-up before write active. | 2 |
| 6. | Address/CS/data hold after write inactive. | 18 |
| 7. | Chip select to write set-up. | 71 |
| 8. | Write pulse width. | 87 |
| | Read Access | MAXIMUM (nS) |
| 9. | Chip select to read set up. | 33 |
| 10. | Address to data valid. | |
| | a. Multiplexed address. | 175 |
| | b. Non-multiplexed address. | 175 |
| 11. | Read to data valid. | 100 |
| 12. | Read to data drive. | 65 |
| 13. | Read to data tristate. | 56 |

| | Clock and Frame Input Timing FIG. 16. | |
|---|---|---|
| REFERENCE | PARAMETER | Value MAX |
| 1. | Framing Set-up before MEG positive edge. | 37 nS |
| 2. | Framing Hold after MEG positive edge. | 59 nS |
| 3. | Framing inactive to next positive edge. | 24 nS |
| 4. | Framing active after previous positive edge. | 57 nS |
| 5. | Maximum frequency of MEG input | 2.5 MHz |
| 6. | Minimum time between transitions of MEG | 60 nS (Min) |

| | NRZ Timings FIG. 17. | |
|---|---|---|
| REFERENCE | PARAMETER | Value Min |
| 1. | NRZ input Set-up time. | 40 nS |
| 2. | NRZ input Hold time. | 120 nS |
| 3. | NRZ output data valid from $\overline{MEG}$ positive edge. | 156 (Max) |

| | CDM TIMINGS FIG. 18. | |
|---|---|---|
| REFERENCE | PARAMETER | Value |
| 1. | CDM output data valid from $\overline{MEG}$ positive edge. | 210 nS (Max) |

Software Control Interface

Figure 19:
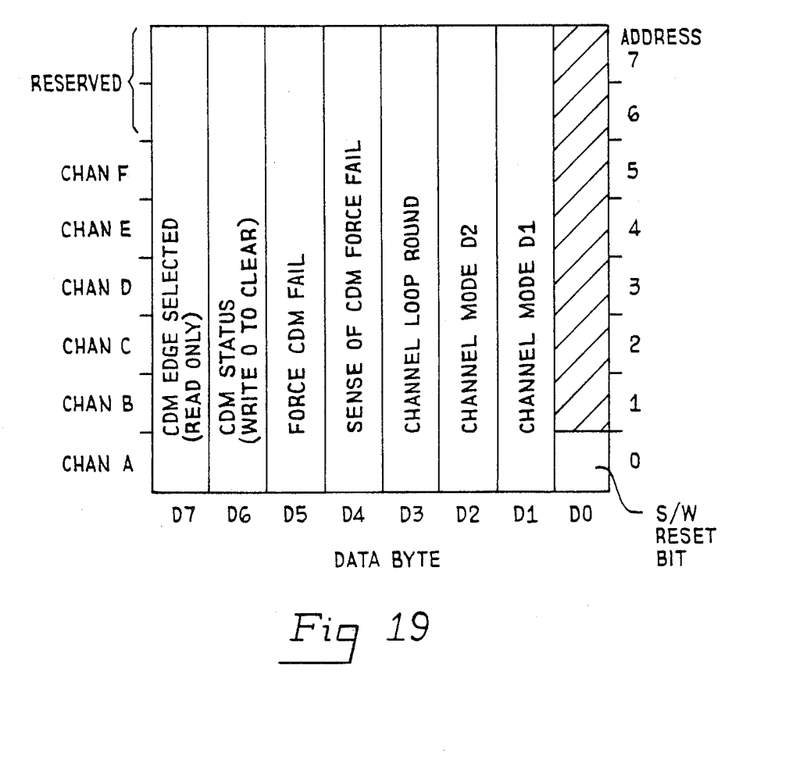
FIG. 19 shows a memory map of a subscriber line interface modem; and, FIG. 20 shows a flow diagram for CDM alarm servicing.

The modem appears to the controlling microprocessor an area of memory, eight bytes long, as shown in FIG. 19. The device is enabled by the 'chip select' input which may be driven by an external memory mapping address decoder. This allows the eight bytes to be placed anywhere in the microprocessors address space. The eight bytes are allocated one per channel, i.e. channels A-F are bytes—5 (bytes 6 and 7 are reserved). Each channel byte has the following bits:

| BIT | COMMENT |
|---|---|
| D0 | Used only on channel 0, device reset. 1 = device reset. 0 = remove reset. |
| D1,D2 | Channel rate control |
| D3 | CDM loopround control. 1 = loopround. |
| D4 | Determines CDM failure state (high or low). Force CDM MONITOR BIT IS ACTIVE '1'. |
| D5 | Force CDM failure bit. 1 = forces a CDM failure. |
| D6 | CDM failure bit; may be reset by writing a '0'. 1 = FAILURE. |
| D7 | CDM input strobe edge being used. |

Interrupt Mechanisms—CDM Failures

Figure 20:
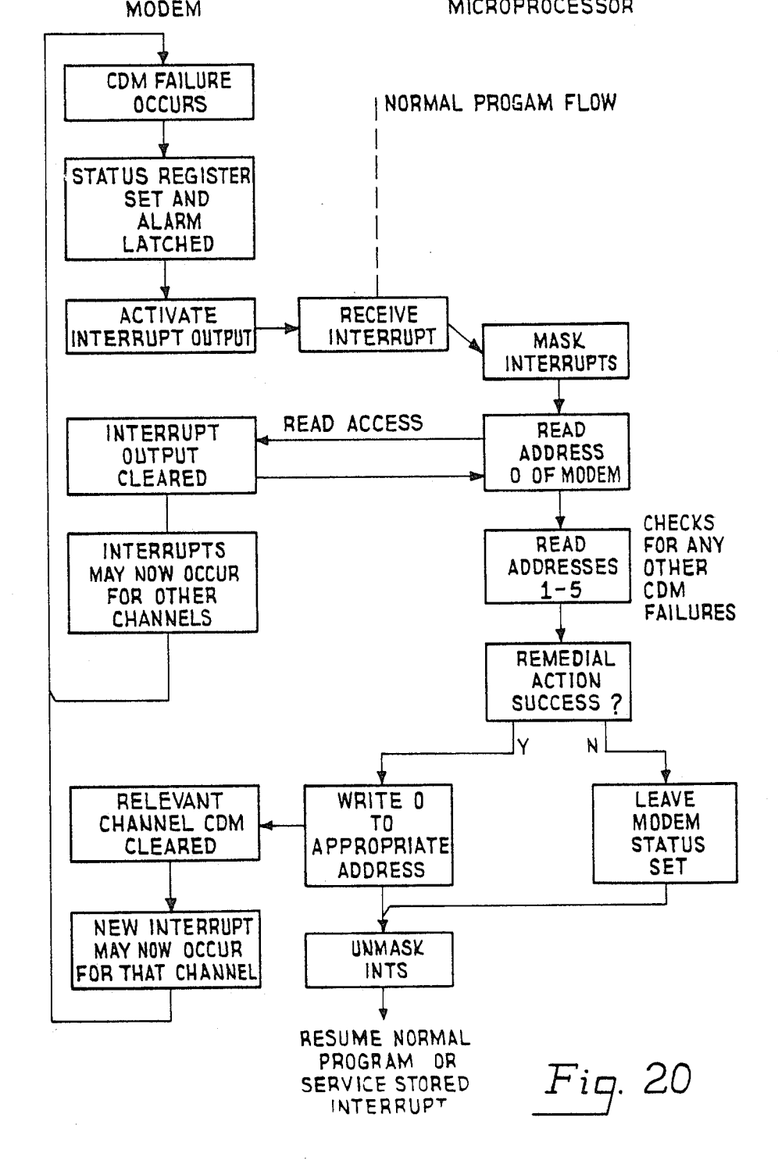

The modem has an interrupt output which is activated if a channel CDM failure occurs. This is the only event that can cause an interrupt. The method of servicing the interrupt is described in FIG. 20 which shows a flow diagram for CDM alarm servicing. The interrupt may also be ignored by the host processor. In this case the CDM alarm bit of each channel is polled at regular intervals. The channels may be addressed in any order.

We claim:

1. A subscriber line interface modem, for use in a telecommunications system line interface module including a control microprocessor, a code detector and a plurality of telecommunication line interface circuits, the modem comprising in combination:

bus interfacing means adapted to receive address, data and control information from the microprocessor for controlling the operation of the modem, and dispatch address, data and control information to the microprocessor for evaluating the operation of the modem, channel means including a non-return to zero/conditioned diphase modulation (NRZ/CDM) conversion means arranged to receive NRZ coded information from the code detector and dispatch CDM information to a telecommunications line interface circuit, said conversion means being further arranged to receive CDM information from the telecommunications line interface circuits and dispatch NRZ coded information to the code detector; and clock supply means arranged to generate timing signals for presentation to the channel means to control the operation of the channel means.

2. A subscriber line interface modem as claimed in claim 1 wherein, the bus interfacing means includes input and output means, a data transceiver which receives, by way of the input means data from, and transmits, by way of the output means, data to the microprocessor, wherein each channel means, is provided with a command register by way of which data is received and transmitted under the control of channel read and write signals.

3. A subscriber line interface modem as claimed in claim 2 wherein, the modem includes a clock rate selection circuit for selecting the timing signals in the form of clock frequencies and window signals for the selection circuit, to operate the selection circuit at frequencies of 64 Kb/s, 32 Kb/s or 16 Kb/s, said clock rate selection circuit being controlled by the command registers.

4. A subscriber line interface modem as claimed in claim 3 wherein, each channel is provided with an edge detection device which monitors an input CDM waveform and compares it with the window signals so that the modem clocks the data at the optimum time by causing the output signal of the CDM/NRZ conversion means to change only when an edge of the CDM waveform coincides with a window of one of the window signals.

5. A subscriber line interface modem as claimed in claim 2, 3 or 4 wherein, the command register generates a loopround control signal which is presented to the CDM/NRZ conversion means to enable the CDM output signal from the NRZ/CDM conversion means to be looped round to the CDM input of the CDM/NRZ conversion means to enable the data path to be checked.

6. A subscriber line interface modem as claimed in claims 5 wherein, the bus interfacing means includes a circuit having a plurality of address input lines and multiplexed address input lines which, receive either address information on address input lines, or address information on the multiplexed address input lines from the data transceiver, and is latched by a latch circuit under the control of the microprocessor prior to being decoded in a decode circuit controlled by the microprocessor to generate the read and write signals for each channel means.

7. A subscriber line interface modem as claimed in claim 6 wherein, the modem is provided with gating means for generating an interrupt signal for despatch to the microprocessor when a CDM channel becomes faulty.

* * * * *